US008787895B2

(12) United States Patent
Jackson

(10) Patent No.: US 8,787,895 B2
(45) Date of Patent: Jul. 22, 2014

(54) SYSTEM AND METHOD FOR PROVIDING ADVERTISING ON A DEVICE

(76) Inventor: Timothy R. Jackson, Yorba Linda, CA (US)

( * ) Notice: Subject to any disclaimer, the term of this patent is extended or adjusted under 35 U.S.C. 154(b) by 405 days.

(21) Appl. No.: 13/342,411

(22) Filed: Jan. 3, 2012

(65) Prior Publication Data
US 2012/0100829 A1    Apr. 26, 2012

Related U.S. Application Data

(62) Division of application No. 12/051,388, filed on Mar. 19, 2008, now Pat. No. 8,107,940.

(60) Provisional application No. 60/918,853, filed on Mar. 20, 2007.

(51) Int. Cl.
*H04M 3/42*      (2006.01)
*H04L 29/06*     (2006.01)
*H04M 3/00*      (2006.01)
*G06Q 30/02*     (2012.01)
*H04M 1/725*     (2006.01)
*H04M 3/487*     (2006.01)

(52) U.S. Cl.
CPC ........ *G06Q 30/0241* (2013.01); *G06Q 30/0271* (2013.01); *H04M 1/72544* (2013.01); *H04M 3/4878* (2013.01); *G06Q 30/0251* (2013.01); *G06Q 30/0273* (2013.01); *G06Q 30/0272* (2013.01); *H04M 2215/0192* (2013.01)
USPC ...................... 455/418; 455/414.1; 455/414.3

(58) Field of Classification Search
CPC ............ H04W 8/245; H04M 1/72525; H04M 1/72522
USPC ..................................... 455/414.1, 414.3, 418
See application file for complete search history.

(56) References Cited

U.S. PATENT DOCUMENTS

| | | |
|---|---|---|
| 5,801,698 A | 9/1998 | Lection et al. |
| 6,484,148 B1 | 11/2002 | Boyd |
| 6,993,326 B2 | 1/2006 | Link, II et al. |
| 7,251,478 B2 | 7/2007 | Cortegiano |
| 8,107,940 B1 | 1/2012 | Jackson |
| 2002/0010775 A1 | 1/2002 | Rakavy et al. |
| 2002/0087401 A1 | 7/2002 | Leapman et al. |
| 2002/0112035 A1 | 8/2002 | Carey et al. |
| 2002/0156677 A1 | 10/2002 | Peters et al. |
| 2002/0184086 A1 | 12/2002 | Linde |
| 2004/0032393 A1 | 2/2004 | Brandenberg et al. |
| 2004/0147265 A1 | 7/2004 | Kelley et al. |
| 2006/0190331 A1 | 8/2006 | Tollinger et al. |
| 2006/0259365 A1 | 11/2006 | Agarwal et al. |
| 2007/0072591 A1 | 3/2007 | McGary et al. |
| 2007/0073934 A1 | 3/2007 | Rogers |
| 2007/0105536 A1 | 5/2007 | Tingo, Jr. |
| 2007/0184820 A1 | 8/2007 | Marshall |
| 2007/0264987 A1 | 11/2007 | Gupta et al. |

*Primary Examiner* — William D Cumming
(74) *Attorney, Agent, or Firm* — Neil A. Steinberg

(57) ABSTRACT

A display system and method of advertising, includes, in one embodiment, loading a graphic advertisement onto a computer-readable medium of an electronic device. The graphic advertisement is or has a time passage indicator for indicating the passage of time. An idle-time sensor determines an idle-time period in which updated application information is not presented on a display of the device due to, for example, data processing activity by the processor, data transfer activity, congestion or latency in the network, or any other activity that occupies resources in the device to delay or temporally preventing updating of the display. The graphic advertisement is displayed when the device is in the idle-time period, animated to indicate the passage of time, and removed after the idle-time period has ended.

20 Claims, 4 Drawing Sheets

SYSTEM AND METHOD FOR PROVIDING ADVERTISING ON A DEVICE

CROSS-REFERENCE TO RELATED APPLICATIONS

This application is a divisional application of application Ser. No. 12/051,388, entitled "System and Method for Providing Advertising on a Mobile Device", filed on Mar. 19, 2008 now U.S. Pat No. 8,107,940. This application, and the '388 application, claim the benefit of U.S. Provisional Application No. 60/918,853, filed Mar. 20, 2007. The '388 and '853 applications are hereby incorporated herein by reference in their entirety.

BACKGROUND OF THE INVENTION

1. Field of the Invention

The present invention relates in general to the fields of delivering and displaying advertising content on cell phones, mobile phones, personal digital assistants (PDAs), and similar wireless devices (collectively, "mobile devices") connected to a network, and in particular to targeting advertising content to each user and displaying the advertising content at optimum times so as to minimize any interruption of the use of the mobile device.

2. Description of Related Art

Advertising on mobile devices is a relatively new concept due to recent improvements in the data capabilities of wireless networks and the introduction of mass market mobile devices with improved display resolutions and data handling capabilities. Certain mobile devices (known as smart phones) execute computer-like operating systems and have data services that allow them to access and view Internet content which includes advertising. Advertising to personal computers (PCs) over data networks has been in practice via the internet for many years.

In the case of Internet advertising, the relatively large display size available on most modern PCs allows advertising content to be displayed in various forms and often without degrading the user experience. The primary content of the website is displayed prominently on the page while advertising content is displayed in the periphery of the page where it does not intrude upon the user's experience.

Advertising is sometimes targeted specifically to users of certain demographics based on the theme of the website containing the advertisement and prior selections or actions taken by the user. For instance, a company that manufactures tires might target their advertising to websites that focus on automotive technology because most users accessing such a website are likely to be interested in automobiles. Such targeted advertising typically commands better advertising rates due to the higher likelihood of attracting a potential customer to the product being advertised.

Some recent Internet advertising has become more invasive. Such advertising is displayed prominently on the page and the primary content of the website is obscured until the ad finishes and/or the user terminates the ad. Other ads are displayed as pop-up windows that appear on top of the webpage and must be closed in order to see the primary content. These practices tend to degrade the user experience, and are only tolerated to obtain "premium" content. Some website operators (and other service providers) provide the option paying a subscription fee to receive the service without advertising interruptions.

Large, prominent, and/or invasive advertisements are difficult to implement, and difficult for users to tolerate, because the display screen on most mobile devices is already so limited.

Another limitation on advertisements on mobile devices is the significant delay required to download even small applications and graphics over typical wireless networks. Data download using standard wired networks (or IEEE compliant wireless networks) provides fast access to data via the Internet. Search times using popular search engines may return hundreds of thousands of results with only 1-2 seconds of delay. As such, a PC user using wired network rarely experiences longer periods of inactivity while waiting for data from the network. PCs also have significant processing power and memory so the time required to process data once it is within the PC is often less than a second.

Mobile devices operating on wireless cellular networks do not experience the same performance. Although wireless carriers are improving the data capability of their networks, the data rates of existing networks are relatively slow. In addition, signal quality and coverage of the cellular network will often reduce the actual data rate a mobile device will experience. Mobile devices are also equipped with slower processors and less memory (relative to a PC) so once the data is received by the mobile device, the processing delay and display of that data takes longer.

In light of the limited display space provided by a mobile device, and the limited network speed and processing power, advertisers are severely limited in what they can do to reach consumers using a mobile device. Traditional web pages that contain large amounts of advertising content can significantly degrade the user experience, and thus prove unacceptable to the consumer.

Nonetheless, advertising on mobile devices is of great interest to companies in this field. Interest in advertising to mobile devices is extremely high right now as carriers are seeking opportunities to increase revenues and traditional Internet content companies (such as Google® and Yahoo®) are looking for ways to generate revenue from mobile customers. Advertising on mobile devices must overcome the limitations of the network and mobile device, while maintaining a positive user experience and insuring that the advertising clients get the best ad exposure for their cost. Prior art systems have yet to achieve these goals simultaneously.

The present invention displays advertising only during idle time, thereby avoiding degradation of the user experience using the mobile device. In prior art systems, such applications typically signify idle time by displaying an animated icon that represents time. Examples include an hour glass that rotates, the face of a clock on which the hands rotate, or flashing directional arrows to indicate that data transfer is taking place. This method is used to indicate to the user that the application is still running (i.e. it is not halted or locked-up) but it is still busy with a processing and/or communication task.

In the present invention, rather than display an hour glass rotating (as in prior art applications) the system displays advertising content, which might be a rotating logo of the advertiser, or a brief animation advertising the product and/or service. This method may actually improve the user experience by entertaining the user during idle times. Because the actual application is more important than the advertising (from the user's perspective), the advertisement is terminated immediately when actual application data is ready to display.

This re-enforces to the users that the application content is not delayed due to delivery of advertising content.

SUMMARY OF THE INVENTION

The present invention teaches certain benefits in construction and use which give rise to the objectives described below.

The present invention provides an advertisement display system and method of advertising via a mobile device. The method first comprises the step of loading a graphic advertisement onto a mobile computer-readable medium of the mobile device. The graphic advertisement has a time passage indicator for indicating the passage of time. An idle-time period is determined in which updated application information cannot be presented on the display of the mobile device due to data processing activity by the processor, data transfer activity, congestion or latency in the wireless network, or any other activity that occupies resources in the mobile device to prevent the updating of the display. The graphic advertisement is displayed on the mobile device when the mobile device is in the idle-time period, and animated so that the time passage indicator indicates the passage of time. The graphic advertisement is removed once the idle-time period has ended.

A primary objective of the present invention is to provide an advertisement display system and method of advertising via a mobile device having advantages not taught by the prior art.

Another objective is to provide an advertisement display system and method of advertising that enables advertisements to be delivered to a mobile device without a negative impact on the function of the mobile device, or any interference with the use of the mobile device by the user.

A further objective is to provide an advertisement display system that enables a method of advertising without the advertising display system interfering with applications running on the mobile device.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an advertisement display system (5) and method of advertising via a mobile device (50). The present invention demonstrates a method for the efficient display of advertising content (general and/or targeted) on a portable or mobile device (50) within the system (5).

Figure 1:
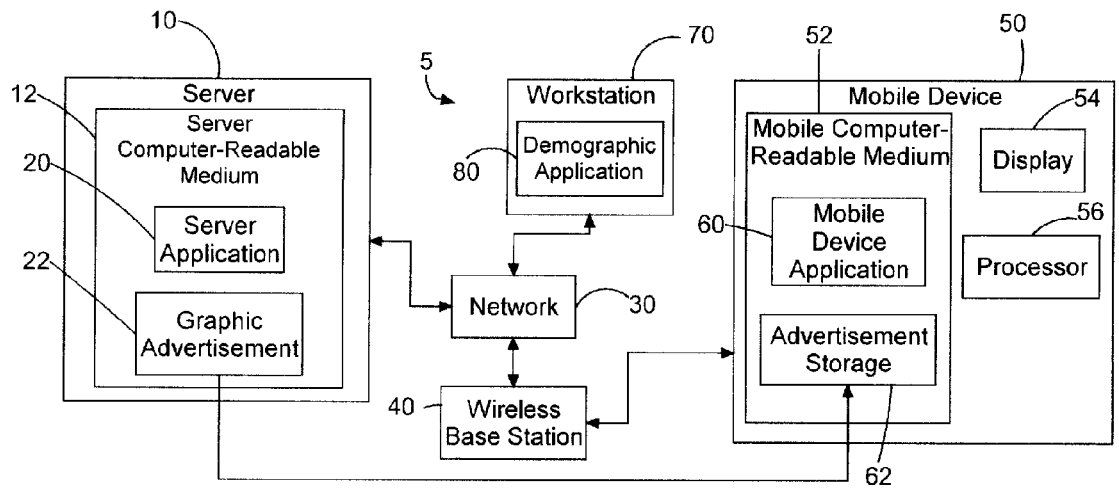
FIG. 1 illustrates one possible top-level system diagram of one embodiment of an advertisement display system of the present invention.

FIG. 1 illustrates one possible top-level system diagram of one embodiment of an advertisement display system (5) of the present invention. As shown in FIG. 1, the advertisement display system (5) includes a server (10), a server application (20) software, a wireless network (30), the mobile device (50) (typically a great number of the devices), and mobile device application (60) software.

In one embodiment, the system (5) may include a set of Wireless Base Stations (40) as part of the wireless network (30), and may further include a workstation (70) and an associated demographic application (80). Each component of the present invention is described herein below.

Server (10)—The server (10) is computer that executes the server application (20) software. The server (10) includes or is able to access a server computer-readable medium (12) for storing the server application (20) and also for storing the graphic advertisement (22), whether as an integral part of the server application (20), or in a separate data storage (not shown). The server (10) may also communicate, via the wireless network (30) or other means, with other servers that may provide additional applications and/or database content. The server (10) may also communicate with the workstation (70). While a single computer is discussed for simplicity, as those skilled in the art will recognize, and this term is hereby defined to include, any single, system, or network of computers that function to handle the data as described in the present specification.

Server Application (20) software—The server application (20) software is a software application that resides in the server (10) (or is accessible by the server (10)) and manages the system.

The mobile device (50) has a mobile computer-readable medium (52) for storing a mobile device application (60) and the ad storage (62). The mobile device (50) also includes a processor (54), and a display (56). As referenced above, the mobile device (50) may be any form of cell phone, mobile phone, personal digital assistant (PDA), navigation device, and/or similar wireless device. Since such devices are well known in the art, and they are not described in greater detail herein.

As shown in FIG. 1, the advertisement display system (5) functions to download a graphic advertisement (22) from a server computer-readable medium (12) to an ad storage (62) of a mobile computer-readable medium (52) via a wireless network (30). This method is described in greater detail below.

Wireless network (30)—The wireless network (30) may be any form of communications system that allows mobile devices (50) to communicate with other mobile devices and/or other devices on the network (30), including but not limited to the server (10). The wireless network (30) may include a global computer network such as the Internet, private LAN, WAN, or similar networks, and/or any other form of network known in the art. The network (30) may also include the wireless base station (40), an electronic device that allows mobile devices (50) to communicate with wireless network (30). The wireless base station (40) may support one or more wireless air interfaces which may include (but are not limited to) WiFi, CDMA, GSM, WCDMA, EDGE, and/or GPRS.

Figure 2:
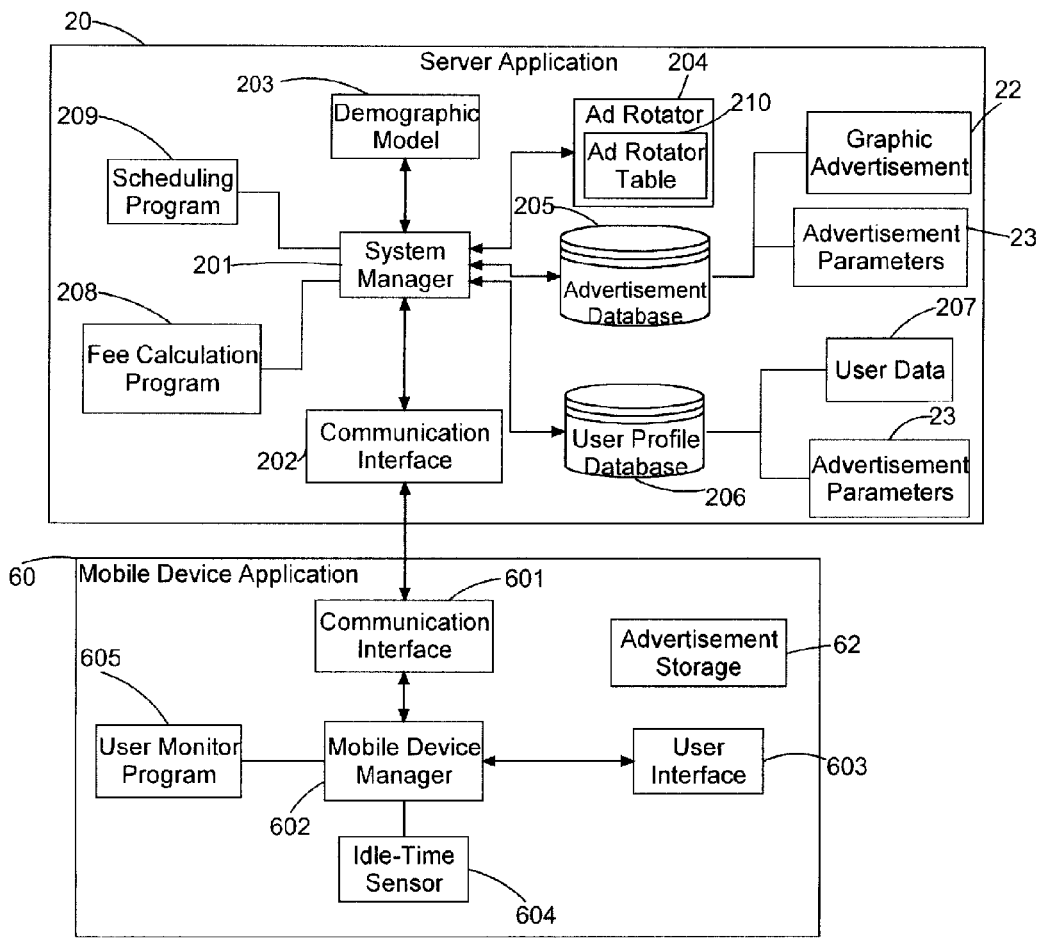
FIG. 2 illustrates one possible system software diagram of the system of FIG. 1.

FIG. 2 illustrates one possible system software diagram of the system of FIG. 1. Referring to FIG. 2, the server application (20) may include (but is not limited to) the following functional modules:

System Manager (201): The system manager (201) is a software program that may be installed on the server computer-readable medium (52), as illustrated in FIG. 1, and provides all control and management functions for the system. The system manager (201) functions to receive the advertisement parameters (23) from many potential sources, and for selecting one of the graphic advertisements (22) based upon the advertisement parameters (23) received. The system manager (201) then transmits the graphic advertisement (22) to the mobile device (50), as discussed above.

Communication Interface (202): The communication interface (202) manages all communications between the server (10) and devices external to the server (10) including (but not limited to) the mobile device (50).

Demographic Model (203): The demographic model (203) receives data from the demographic application (80), queries the user profile database (206), and generates output data that represents statistical analysis of said database query relative to the demographic application (80) data.

Ad Rotator (204): The ad rotator (204) module receives information from the system manager (201) and the advertisement database (205) and generates an ad rotator table (210) of ads for each user contained in the user profile database (206). The ad rotator table (210) includes instructions on which graphic advertisement (22) is to be displayed in each given situation.

Advertisement Database (205): The advertisement database (205) contains the advertising content that will be transferred to and displayed on a mobile device (50). The advertisement database (205) may include the graphic advertisements (22) associated with advertisement parameters (23) that are useful for targeting the graphic advertisements (22) to particular users of the system, as discussed in greater detail below.

User Profile Database (206): The user profile database (206) contains detailed information (including but not limited to: name, address, telephone number of the mobile device (50), food preferences, entertainment preferences, recreation preferences, cultural interests, religious interests, and other consumer oriented activities, events, and services) relating to each registered user of the system.

Also illustrated in FIG. 2 is the mobile device application (60), which is adapted to be loaded onto the mobile computer-readable medium (52) (illustrated in FIG. 1). The mobile device application (60) software includes (but is not limited to) the following functional modules:

Communication Interface (601): The communication interface (601) manages all communications between the mobile device (50) and the server (10).

Mobile Device Manager (602): The mobile device manager (602) module provides all control and management functions for the application operating within the mobile device (50).

User Interface (603): The user interface (603) monitors the input controls on the mobile device (50) and communicates changes in the input controls to the mobile device manager (602.) The user interface (603) receives data from the mobile device manager (50) and communicates the information to the output resources within the mobile device (50).

It is important to note that the present invention and associated server application (20) software and mobile device application (60) software can be implemented in a variety of ways. The embodiment described herein is in no way meant to limit the options for implementation.

System Operation Using the Present Invention

A system (5) implemented with technology relating to the present invention allows placement of specifically targeted advertising on Mobile Devices (50) without degrading the user experience. This method has significant value in that it makes use of the idle time on Mobile Devices (50) in order to present advertising content. It also allows advertising clients to precisely target advertising content that very closely matches the interests of each potential customer.

Figure 3:
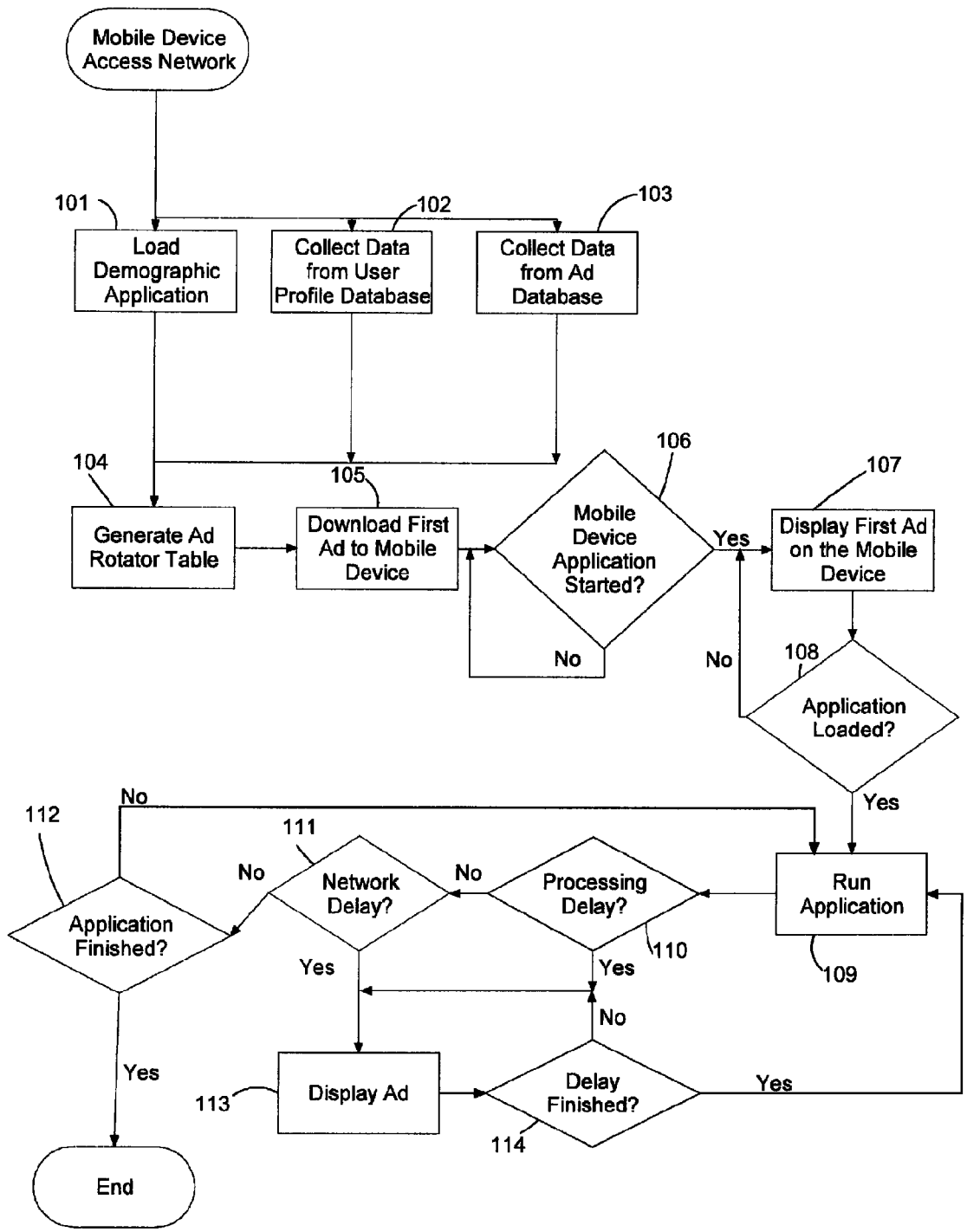
FIG. 3 illustrates one possible top-level flow diagram of the system operation.

The basic concept of the present invention is to display advertising content whenever the Mobile Device (50) experiences idle time. Idle time is defined as any time during which updated application information cannot be presented on the display of a Mobile Device (50) due to data processing activity, data transfer activity, network congestion, network latency, or any other activity that occupies resources in the Mobile Device (50.) A top-level flow diagram of the present invention is illustrated in FIG. 3.

With prior access of the system by a potential customer (user), advertising demographics may be created using a workstation (70) to access (101) the demographic application (80) to create a specific demographic model (203). The demographic model (203) is created by selecting a set of preferences. Such preferences may include (but are not limited to) types of food, recreational activities, types of entertainment, cultural preferences, religious preferences, etc. Upon completing the demographic model (203), the demographic application (80) may be used to compare the demographic model (203) to the user records in the user profile database (206).

The comparison will determine statistics relating to how closely each user in the user profile database (206) matches the elements contained in the demographic model (203). The statistics may then be used to enhance, modify, and/or adjust the demographic model (203). This powerful demographic application (80) allows an advertising client to precisely target advertising contents to user of the system.

During normal operation of the system, the server (10) utilizes the demographic model (203) and collects data (102, 103) from the advertisement database (205) and user profile database (206) to generate (104) an ad rotator (204). The ad rotator (204) defines which advertising content will be delivered to each specific user via a mobile device (50). The ad rotator (204) also determines in which order and/or during which idle times specific advertising content is presented.

Each time a mobile device (50) accesses the network, the server (10) may download advertising content (105) to the mobile device (50). This allows the mobile device (50) to display advertising content during the idle time that may occur when mobile device application (60) software is booting on the mobile device (50) without the need to access the network.

When a user accesses the mobile device application (60) software on the mobile device (50), the first advertising content is displayed (107) on the mobile device (50). The advertising content is displayed only during the idle time (108) required to load the application. Upon successful loading (109) of the mobile device application (60) software, the advertising content is removed and application information is displayed. As the mobile device application (60) software is operating, any time the application experiences idle time (for example a processing delay (110) or a network delay (111)) advertising content will be displayed (113) until the idle time expires (114), at which time the advertising content is removed and the application information is displayed. This process may be repeated for any and all mobile device application (60) software that operates on a given mobile device (50).

Example Use Case of Present Invention

The present invention is integrated into a wireless network that provides cellular telephone service. One of the mobile device application (60) services available on the wireless network is a mobile concierge service that allows a user to find local activities and services by using a mobile device (50). The mobile concierge service uses GPS technology to establish the geographic location of the mobile device (50) and a user profile database (206) to establish the preferences of the user of that mobile device (50). When the user accesses this mobile concierge service, the user may click buttons (labeled include Food, Entertainment, Concerts, ATM, Gas, Coffee, Recreation, Movies, etc.) on the display in order to search for specific activities.

Each time the user accesses the mobile concierge service there is idle time of 2-3 seconds while the mobile device application (60) is loading. During this idle time, the mobile device (50) displays the red Coke® logo as a 1" high icon in the center of the display. Said logo rotates clockwise every ½ second of idle time that passes. By rotating the logo in this fashion the user recognizes that the mobile device application (60) is still loading. When the mobile device application (60) finishes loading, the logo is removed from the screen and the application information is displayed.

The user now decides to search for a place to eat in the local area. The user clicks the button labeled Food to initiate a search. Because the mobile device application (60) must send a request across the wireless network (30) in order to access the server (10), resulting idle time occurs. During this idle time, the system displays advertising content for Taco Bell® because the user has initiated a search for food and the user profile database (206) indicates that user likes both fast food and Mexican food. Once the search results are returned to the mobile device application (60) by the server (10), the advertisement content is removed and the search results are displayed.

The user reviews the search results and decides to request a map to one of the restaurants listed in the search results. This request requires access to the wireless network (30) in order to retrieve a map from the server (10). Because it typically takes 6 to 10 seconds for a map download to complete, this time the system displays advertising content for AMC Theaters® which is a brief animation. This advertising content is chosen because there is an AMC Theater® within 1 mile of the geographic location of the mobile device (50).

The present invention discloses, in general, a method for the delivery of advertising content to a portable or mobile device that is attached to a communications network, and in particular a method for the display of said advertising content (general and/or targeted) on a portable or mobile device during the idle time that occurs while the device is communicating with the network, executing a process, and/or any other time that updated application content cannot be displayed on the device. The present invention discloses methods for precisely targeting said advertising content to specific user demographics based on known information about a user (or users) of a portable device, said user's present interests, and/or said user's present location.

Figure 4:
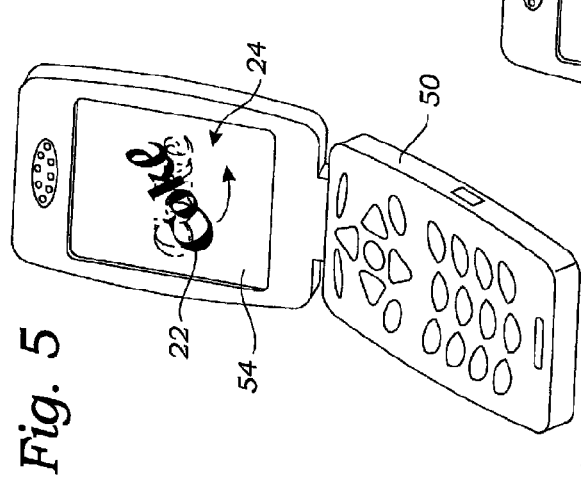
FIG. 4 is a front elevational view of one embodiment of the mobile device executing one embodiment of the graphic advertisement.

FIG. 4 is a front elevational view of one embodiment of the mobile device (50) executing one embodiment of the graphic advertisement (22) on the display (54) of the mobile device (50). As illustrated in FIG. 4, in this embodiment, the graphic advertisement (22) is animated and includes a time passage indicator (24) that indicates the passage of time. In the embodiment of FIG. 4, the time passage indicator (24) includes a plurality of radially extending lines that move around the graphic advertisement (22) with time. In this embodiment, the graphic advertisement (22) is a "Coke®" logo; however, this may be any form of advertisement, preferably a logo, graphic design, advertisement, or similar symbol. The graphic advertisement (22) is removed once the idle-time period has ended.

Figure 5:
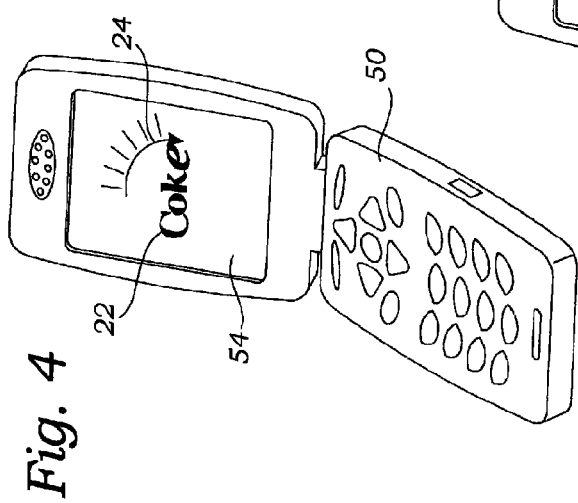
FIG. 5 is a front elevational view of the mobile device executing another embodiment of the graphic advertisement.

In the embodiment of FIG. 5, the graphic advertisement (22) is similar to FIG. 4, only the time passage indicator (24) is provided by the rotation of the graphic advertisement (22). While rotation is illustrated in FIG. 5, any form of movement may be used to show that the mobile device (50) is functioning properly, and has not "frozen" due to an failure in processing or network access.

Figure 6:
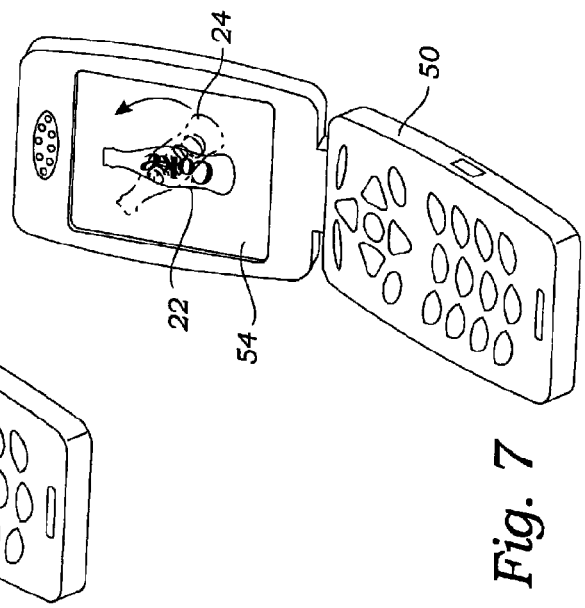
FIG. 6 is a front elevational view of the mobile device executing a third embodiment of the graphic advertisement.
Figure 7:
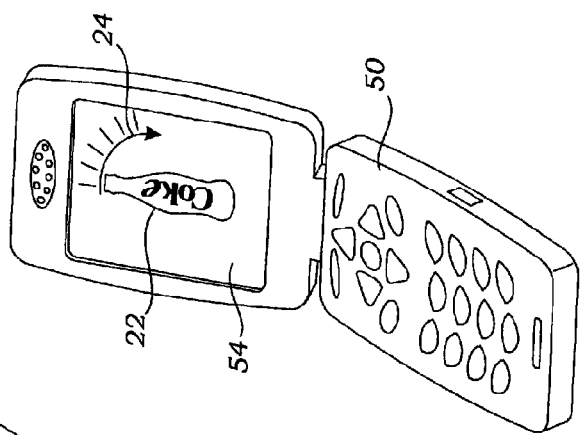
FIG. 7 is a front elevational view of the mobile device executing a fourth embodiment of the graphic advertisement.

Similarly, FIGS. 6 and 7 are front elevational views of the mobile device (50) executing other embodiments of the graphic advertisement (22). In these embodiments, the graphic advertisement (22) includes a Coke® bottle, and the time passage indicator (24) is provided by radial lines (24) (FIG. 6) and by the rotation of the graphic advertisement (22) (FIG. 7). Those skilled in the art will recognize that a wide variety of symbols or advertisements may be used in this manner, and a wide variety of movement may be used, to meet the requirements of the present invention, and such alternative embodiments should be considered within the scope of the present invention.

Figure 8:
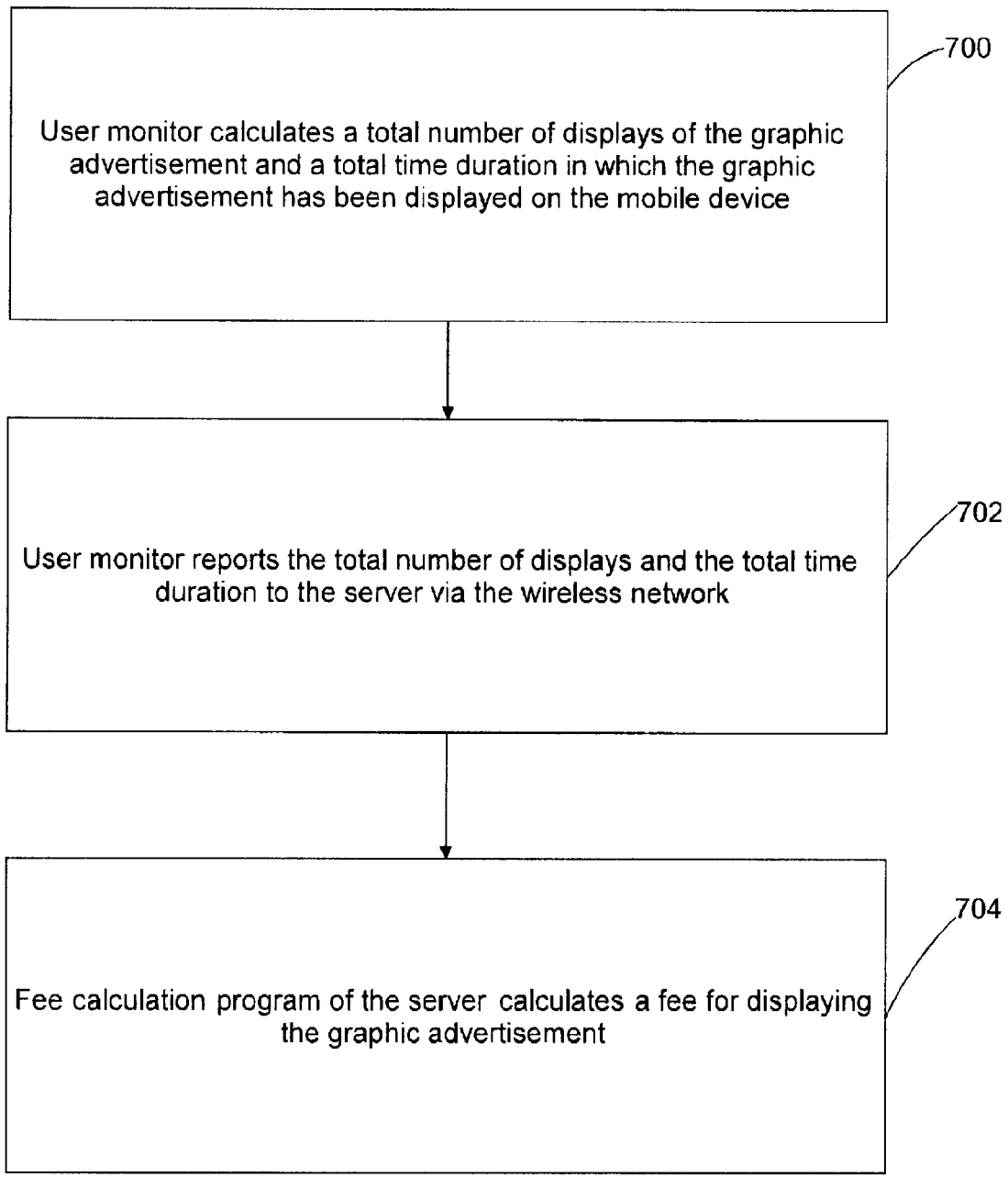
FIG. 8 illustrates one possible flow diagram of the function of a user monitor and a fee calculation program of the present invention.

FIG. 8 illustrates one possible flow diagram of the function of the user monitor program (605) and the fee calculation program (208) (shown in previous figures.) of the present invention. As shown in FIG. 8, the user monitor program (605) calculates (700) a total number of displays of the graphic advertisement (22) and a total time duration in which the graphic advertisement (22) has been displayed on the mobile device (50). The user monitor program (605) then reports (702) the total number of displays and the total time duration to the server (10) via the wireless network (30). The fee calculation program (208) of the server (10) then calculates (704) a fee for displaying the graphic advertisement (22).

The terminology used in the specification provided above is hereby defined to include similar and/or equivalent terms, and/or alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless specifically stated otherwise.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method of advertising via a device accessing a network, the device having a computer-readable medium, a processor, a display, and a first time passage indicator to indicate a passage of time during idle-time periods, wherein the first time passage indicator is disposed on or in the computer-readable medium, the method comprising:

loading a second time passage indicator onto or into the computer-readable medium of the device before detecting a first idle-time period, wherein the second time passage indicator is different from the first time passage indicator and the second time passage indicator (i) is representative of a graphic advertisement and (ii) indicates a passage of time during the first idle-time period;

updating application information on or in the device and thereby providing the first idle-time period;

displaying the second time passage indicator on the display of the device during the first idle-time period, wherein the first idle-time period includes a time corresponding to updating application information on or in the device and wherein the graphic advertisement of the second time passage indicator is associated with an entity, product and/or service; and animating the graphic advertisement of the second time passage indicator on the display of the device during at least a portion of the first idle-time period.

2. The method of claim 1 further including removing the graphic advertisement after the idle-time period expires.

3. The method of claim 1 further including:
determining a fee metric corresponding to the display of the graphic advertisement; and
outputting the fee metric.

4. The method of claim 3 wherein the fee metric correlates to a number of displays of the graphic advertisement, a display time duration of the graphic advertisement and/or an amount of animation of the graphic advertisement.

5. The method of claim 1 wherein during the first idle-time period, the updated application information is not presented on the display of the device due to data processing activity by the processor, data transfer activity, congestion and/or latency in the network.

6. The method of claim 1 wherein the device is a mobile device.

7. The method of claim 1 wherein updating application information on or in the device further includes receiving application information on or in the device.

8. The method of claim 7 wherein receiving application information further includes wirelessly receiving application information.

9. The method of claim 1 further including:
pre-loading a plurality of time passage indicators in the computer-readable medium of the device, wherein each time passage indicator of the plurality of time passage indicators is different from the first time passage indicator and representative of a graphic advertisement; and
wherein displaying the second time passage indicator on the display of the device further includes automatically displaying the second time passage indicator during the first idle-time period, wherein the second time passage indicator is one of the plurality of pre-loaded time passage indicators.

10. The method of claim 9 further including:
receiving an ad rotation table, wherein the ad rotation table defines an order of display of more than one of the time passage indicators of the plurality of time passage indicators; and
storing the ad rotation table in the computer-readable medium of the device.

11. The method of claim 10 further including displaying the more than one of the time passage indicators on the display of the device in an order of display corresponding to the ad rotation table.

12. The method of claim 1 wherein the second time passage indicator includes a logo which is associated with the entity, product and/or service.

13. The method of claim 1 further including:
transmitting an internet search inquiry directed to a first subject matter; and
receiving a first subject matter specific graphic advertisement which is associated the first subject matter of the internet search inquiry wherein the graphic advertisement of the second time passage indicator is the first subject matter specific graphic advertisement.

14. The method of claim 13 wherein the first subject matter specific graphic advertisement is associated with a food or drink entity provider, product and/or service.

15. The method of claim 14 wherein the idle-time period relating to the internet search inquiry depends on data transfer activity, congestion and/or latency in the network.

16. The method of claim 1 further including terminating the idle-time period when the application information is displayed and operative.

17. The method of claim 16 further including removing the graphic advertisement of the second time passage indicator at the conclusion of the idle-time period.

18. An electronic device coupled to and utilizing a network, the electronic device comprising:
a computer-readable medium to store (i) one or more device applications, (ii) a first time passage indicator to indicate a passage of time during idle-time periods, and (ii) a second time passage indicator which (a) is representative of a graphic advertisement and (b) indicates a passage of time during an first idle-time period;
a processor, coupled to the computer-readable medium, to output data which is representative of the graphic advertisement as o! the second time passage indicator during the first idle-time period as a substitute for the first time passage indicator, wherein the first idle-time period includes a time corresponding to updating application information of one or more device applications, and wherein the graphic advertisement is associated with an entity, product and/or service; and
a display, coupled to the processor and the computer-readable medium, to visually output the graphic advertisement of the second time passage indicator during the first idle-time period as a replacement of the first time passage indicator, wherein the display visually outputs an animation of the graphic advertisement of the second time passage indicator during at least a portion of the first idle-time period.

19. The device of claim 18 further including:
memory to store a plurality of pre-loaded time passage indicators, wherein each time passage indicator of the plurality of time passage indicators is representative of a graphic advertisement and, wherein the display visually outputs one of the plurality of time passage indicators during at least a portion of the idle-time period.

20. The device of claim 18 wherein the processor detects an end of the idle-time period and, in response thereto, terminates the display of the graphic advertisement of the second time passage indicator.

* * * * *